J. N. WILBUR.
ATTACHMENT FOR MOWING MACHINES.
APPLICATION FILED JAN. 24, 1918.
1,295,659.
Patented Feb. 25, 1919.
2 SHEETS—SHEET 1.
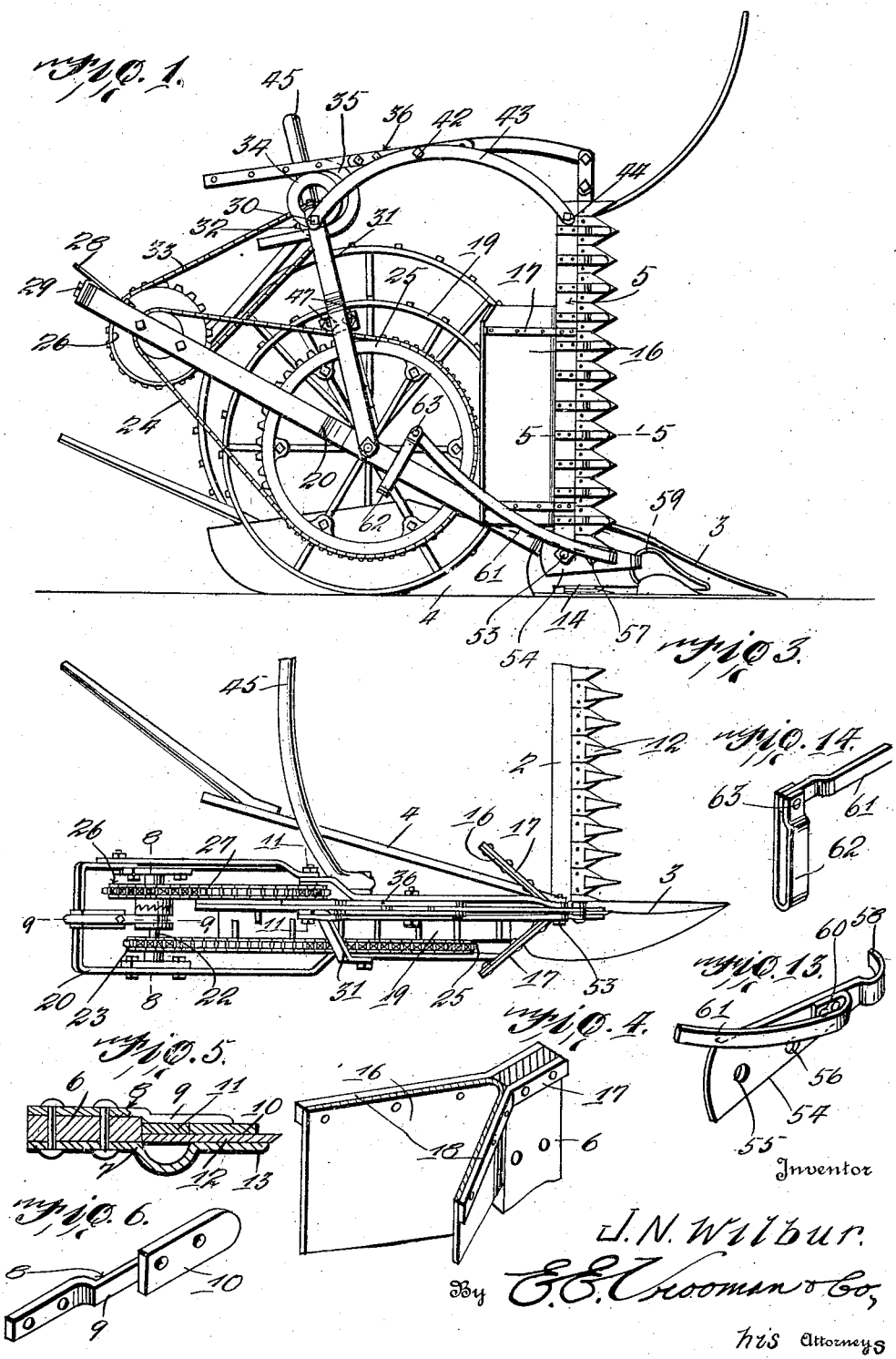
Inventor
J. N. Wilbur.
By E. E. Vrooman & Co.,
his Attorneys

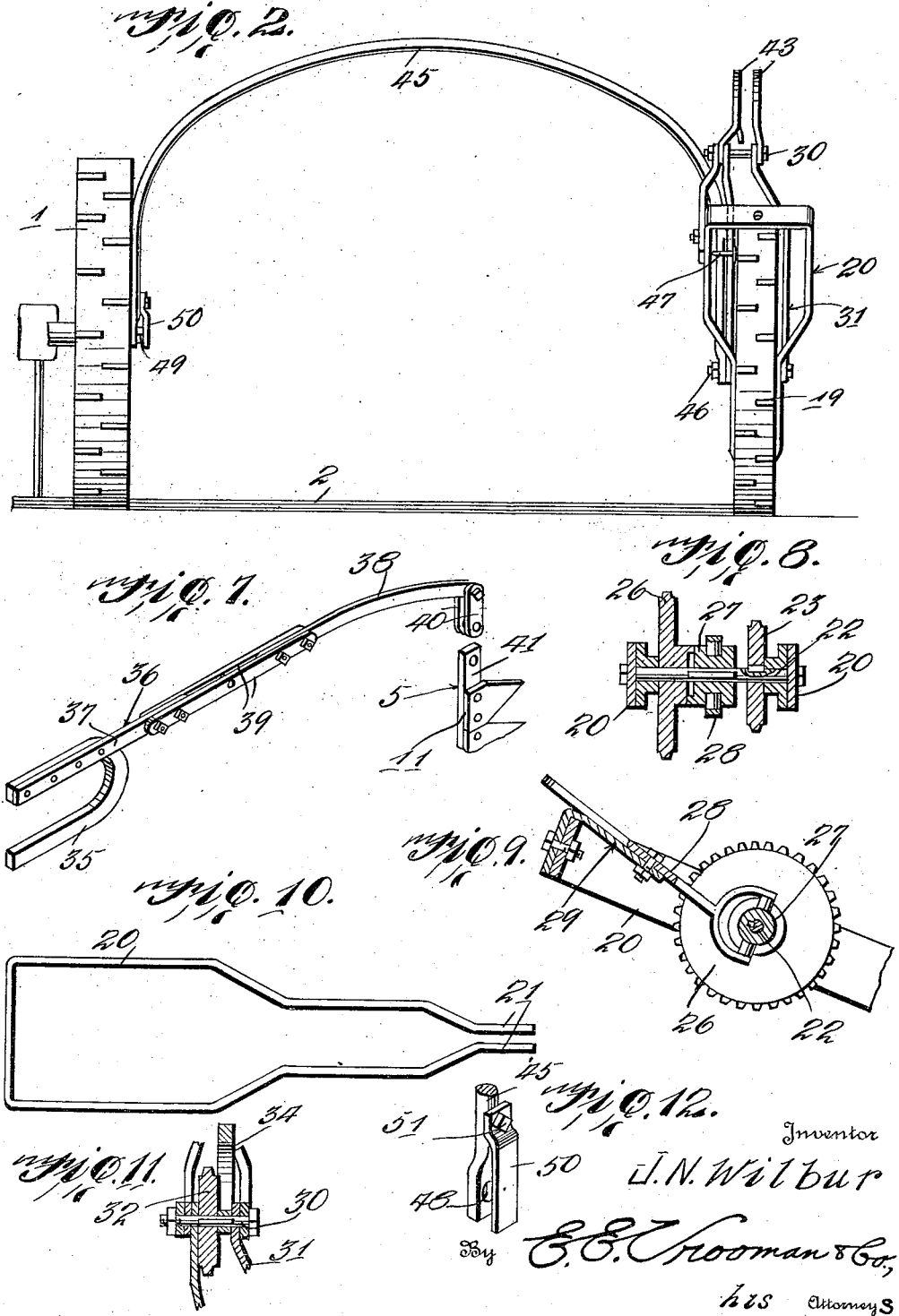

UNITED STATES PATENT OFFICE.

JOHN N. WILBUR, OF TACOMA, WASHINGTON.

ATTACHMENT FOR MOWING-MACHINES.

1,295,659.   Specification of Letters Patent.   Patented Feb. 25, 1919.

Application filed January 24, 1918. Serial No. 213,564.

*To all whom it may concern:*

Be it known that I, JOHN N. WILBUR, a citizen of the United States of America, residing at Tacoma, in the county of Pierce and State of Washington, have invented certain new and useful Improvements in Attachments for Mowing-Machines, of which the following is a specification, reference being had therein to the accompanying drawings.

This invention relates to an attachment for mowing machines and has for its object the production of a simple and efficient means for actuating the vertical sickle which is attached to the mowing machine.

Another object of this invention is the production of a simple and efficient means for supporting and operating the vertical sickle bar in conjunction with a mowing machine.

With these and other objects in view this invention consists of certain novel constructions, combinations and arrangements of parts as will be hereinafter fully described and claimed.

In the drawings:—

Figure 1 is a side elevation of the vertical sickle bar operating mechanism.

Fig. 2 is a rear elevation of a portion of a mowing machine, the vertical sickle mechanism being shown in rear elevation.

Fig. 3 is a top plan view of the vertical sickle bar mechanism.

Fig. 4 is a fragmentary perspective view showing the mounting of the fender plate.

Fig. 5 is a section taken on line 5—5 of Fig. 1.

Fig. 6 is a detail perspective view of one of the ledger plates carried by the vertical sickle bar.

Fig. 7 is a detail perspective view of the lever means for actuating the vertical sickle bar.

Fig. 8 is a section taken on line 8—8 of Fig. 3.

Fig. 9 is a section taken on line 9—9 of Fig. 2.

Fig. 10 is a top plan view of the lower frame of the vertical sickle bar operating mechanism.

Fig. 11 is a section taken on line 11—11 of Fig. 3.

Fig. 12 is a detail perspective of the inner end of the arch brace which is adapted to connect to the axle of the mowing machine.

Fig. 13 is a fragmentary perspective view of the shoe-bar with the shoe engaging finger plate attached thereto.

Fig. 14 is a fragmentary, perspective view of the shoe-bar, showing the pivoted loop attached thereto.

By referring to the drawings it will be seen that 1 designates the frame of the mowing machine which is provided with the usual horizontal mower bar 2. This horizontal mower bar 2 carries a shoe 3 to which is attached a swather board 4.

This shoe 3 carries a vertical sickle bar 5 which vertical sickle bar comprises a main standard 6 which standard 6 carries a guard plate 7 and a plurality of ledger plates 8. One of these ledger plates 8 is shown in detail in Fig. 6 and comprises a securing arm 9 having a knife engaging tongue 10 which is secured to this outer end thereof. A knife carrying plate 11 is interposed between the ledger plates 9 and the guard plate 7 and this knife carrying plate 11 supports a plurality of blades 12 which blades constitute the knife vertical sickle. By means of the structure shown clearly in Fig. 5, it will be seen that the knife blades 12 are interposed between the tongue 10 and the forwardly extending guard fingers 13 of the guard plate 7. The lower end of this knife or sickle supporting standard 6 is secured to the shoe 3 as indicated at 14 by means of a bolt or other securing means 15.

A substantially V-shaped shield 16 is secured to the sickle carrying standard 6 and is held in engagement therewith by means of the bracket plates 17 which bracket plates are secured to the standard 6 and have their outwardly extending ends 18 engaging the outer face of the guard 16. This guard plate or fender 16 acts as a rest for the grass while the sickle is operating and also prevents the grass from being entangled with the supporting wheel 19.

The supporting wheel 19 is carried by the frame 20 and this frame 20 has its forwardly extending ends 21 fitting over the lower end of the sickle 5 and receiving the bolt 15 for constituting an efficient means for connecting the frame 20 to the lower end of the sickle 5. The frame 20 extends upwardly at an angle to the horizontal axis to the wheel 19 and supports a sprocket carrying shaft 22 near the upper end thereof. This sprocket carrying shaft 22 carries a primary driving sprocket 23 which is keyed thereto and this sprocket 23 is driven by means of a sprocket chain 24 which passes over the main driving sprocket 25 secured to the wheel 19. A loosely mounted sprocket 26 is carried by the shaft 22 and is adapted to be engaged by a sliding clutch 27 which clutch 27 is also keyed to the shaft 22. This clutch 27 is engaged by means of an operating lever 28 which operating lever 28 is pivotally mounted upon a bracket 29 carried by the frame 20 thereby enabling the operator to shift the clutch for driving the sprocket 26 when it is so desired.

A cam supporting shaft 30 is carried by an upwardly extending auxiliary frame 31 which frame 31 is carried by the lower frame 20. The shaft 30 carries a sprocket wheel 32 and this sprocket wheel is driven through the medium of the chain 33 which also passes over the sprocket wheel 26. An eccentric wheel 34 is keyed to the shaft 30 and works within a yoke 35 carried by an operating lever 36. This operating lever 36 is shown in detail in Fig. 7 and comprises an inner finger 37 and an outer finger 38, said fingers 37 and 38 being connected by the links 39. The outer end of the finger 38 is connected to a pair of links 40 which links are in turn connected to the upper end 41 of the knife carrying plate 11 of the vertical sickle 5. The links 39 are pivotally connected or supported upon a bolt 42 carried by the arch brace bars 43 which brace bars are connected to the shaft 30 at one end by a securing bolt 44 carried by the upper end of the standard 6 of the vertical mower bar 5.

From the foregoing description it will be seen that a very simple and efficient means has been produced for operating the vertical sickle bar through the medium of the eccentric wheel 34 acting upon the yoke 35 and thereby rocking the lever 36 and in turn reciprocating the knife carrying plate 11.

In order that the vertical sickle bar operating mechanism may be placed and held in proper relation with respect to the main mowing machine 1, an arch brace 45 is employed which is connected at one end to the axle 46 which supports the wheel 19 and passes through a yoke bolt 47 carried by the vertical frame 31. The opposite end of the arch plates 45 is provided with an aperture 48 which passes through the axle 49 of the main mowing machine 1 and a retaining plate 50 is secured to the arch plates 45 by means of a bolt 51 and the other end of the shaft 49 for firmly holding the arch plates 45 from being accidentally released from the shaft 49.

Referring particularly to Figs. 13 and 14, attached by the shoe bolt 53 is a shoe-engaging finger-plate 54. This plate 54 is provided with an aperture 55 through which bolt 53 extends, and said plate 54 is provided with a second aperture 56 for a second attaching means, as indicated at 57, Fig. 1. At the front end of shoe-engaging finger-plate 54 is a hook 58 that overlaps the flange 59 on shoe 3, Fig. 1. Fastened at 60, to plate 54, is the shoe bar 61 which bar 61 carries at its upper end loop 62, loop 62 being pivotally mounted at 63 on the bar 61. The loop 62 surrounds a portion of the side of the frame 20, Fig. 1, and loop 62 limits the movement of shoe 3 in a vertical plane, since by reason of the double fastening of the bar 61, at 60, to the plate 54, when the shoe 3 rides over uneven ground it will slightly pivot on bolt 53, causing the forward end of the shoe to rise or fall, owing to the unevenness of the ground, swinging the bar 61 in a vertical plane, but by reason of the loop 62 being attached to said bar 61, and said loop surrounding the side of the frame 20, too much play of the shoe will not be permitted.

What is claimed is:—

1. A vertical sickle attachment for mowing machines comprising a driving wheel, a frame, a vertical sickle bar, an upwardly extending auxiliary frame secured to said first mentioned frame, an arch brace secured to said auxiliary frame and to the upper end of said sickle bar, a lever carried by said arch brace for operating said sickle bar, said lever provided with a substantially U-shaped rear end, and an eccentric wheel working within said substantially U-shaped rear end, a shaft supporting said eccentric wheel, and means for driving said eccentric wheel.

2. A vertical sickle attachment for mowing machines comprising a driving wheel, a frame, a vertical sickle bar, an upwardly extending auxiliary frame secured to said first mentioned frame, an arch brace secured to said auxiliary frame and to the upper end of said sickle bar, a lever carried by said arch brace for operating said sickle bar, said lever provided with a substantially U-shaped rear end, an eccentric wheel working within said substantially U-shaped rear end, a shaft supporting said eccentric wheel, means for driving said eccentric wheel, said lever comprising a plurality of sections, and link means connecting the inner ends of said sections.

3. A vertical sickle attachment for mowing machines comprising a driving wheel, a frame, a vertical sickle bar, an upwardly extending auxiliary frame secured to said first mentioned frame, an arch brace secured to said auxiliary frame and to the upper end of said sickle bar, a lever carried by said arch brace for operating said sickle bar, said lever provided with a substantially U-shaped rear end, an eccentric wheel working within said substantially U-shaped rear end, a shaft supporting said eccentric wheel, means for driving said eccentric wheel, a driving sprocket carried by said first mentioned frame, a shaft supporting said driving sprocket and keyed thereto, a loosely mounted sprocket carried by said last mentioned shaft, a clutch for engaging said loosely mounted sprocket for causing the same to rotate with said last mentioned shaft, a sprocket carried by said driving wheel, a chain passing over said driving sprocket and said sprocket carried by said driving wheel, and a chain passing over said loose sprocket for driving said eccentric wheel.

4. A vertical sickle attachment for mowing machines comprising a main frame, a vertical sickle bar, means connecting said bar to said main frame, a frame connected to said vertical sickle bar, an arch brace secured to said last mentioned frame, said main frame provided with an axle, one end of said arch brace overhanging one end of said axle, and a retaining plate secured to said arch brace and connected at one end to said axle for supporting said arch brace upon said axle.

In testimony whereof I hereunto affix my signature.

JOHN N. WILBUR.

Copies of this patent may be obtained for five cents each, by addressing the "Commissioner of Patents, Washington, D. C."